United States Patent

Schelling et al.

[11] Patent Number: 5,706,097
[45] Date of Patent: Jan. 6, 1998

[54] INDEX PRINT WITH A DIGITAL RECORDING MEDIUM CONTAINING STILL IMAGES, MOTION SEQUENCES, AND SOUND SEQUENCES

[75] Inventors: Anna Schelling, Geneva; Joseph J. Wrobel; John Randall Fredlund, both of Rochester, all of N.Y.

[73] Assignee: Eastman Kodak Company, Rochester, N.Y.

[21] Appl. No.: 713,306

[22] Filed: Sep. 13, 1996

[51] Int. Cl.[6] .............. H04N 1/00; H04N 5/225; G03B 27/44; G03B 27/52
[52] U.S. Cl. .............. 358/296; 358/401; 358/909.1; 355/40; 355/54
[58] Field of Search .............. 358/296, 302, 358/335, 401, 403, 909.1; 355/40, 54, 77; 235/462

[56] References Cited

U.S. PATENT DOCUMENTS

| | | | |
|---|---|---|---|
| 4,805,087 | 2/1989 | Frankel et al. | 235/462 X |
| 4,903,068 | 2/1990 | Shiota | 355/40 X |
| 5,335,072 | 8/1994 | Tanaka et al. | 358/909.1 |
| 5,400,152 | 3/1995 | Manica et al. | 358/302 X |
| 5,508,783 | 4/1996 | Iwagaki et al. | 355/40 |
| 5,633,725 | 5/1997 | Nishida et al. | 358/302 |

*Primary Examiner*—Eric Frahm
*Attorney, Agent, or Firm*—Thomas H. Close

[57] ABSTRACT

In combination with a digital recording medium having recorded thereon individually addressable digital data files containing still images, motion sequences and sound sequences, an index print, having a plurality of index images representing the still images, motion sequences and sound sequences on the digital recording medium, the index images including a subject matter descriptor, an index code usable for addressing the individual digital data files, and a type indicator for indicating the type of subject matter contained in the data file.

9 Claims, 2 Drawing Sheets

INDEX PRINT WITH A DIGITAL RECORDING MEDIUM CONTAINING STILL IMAGES, MOTION SEQUENCES, AND SOUND SEQUENCES

CROSS REFERENCE TO RELATED APPLICATION

Reference is made to and priority claimed from U.S. Provisional Application Ser. No. U.S. Ser. No. 60/006,448, filed 13 Nov. 1995, entitled INDEX PRINT FOR DIGITAL RECORDING MEDIUM.

FIELD OF THE INVENTION

The invention relates generally to a method for identifying images and sound recordings on a digital recording medium. More specifically, to an index print for indicating the subject matters of the digital recording medium.

BACKGROUND OF THE INVENTION

U.S. Pat. No. 5,258,880 issued Nov. 2, 1993, to Takahashi shows a system for capturing and printing images contained on videotape. The system includes a videotape recorder, connected to a video printer. The video printer contains a memory for storing video images taken from the videotape at locations determined by an operator. The operator while looking at pictures presented on a monitor connected to the videotape recorder determines the desired picture locations on the videotape and actuates the video printer to capture the desired images. The desired images are then printed out on an index print that includes a plurality of images with a picture address in the form of a time code indicating the location of the image on the tape. A user employs the index print to locate scenes on the videotape.

The PhotoCD™ system sold by Eastman Kodak Company includes a compact disc (CD) upon which are recorded a number of still photographic images. An index print showing an individually numbered thumbnail image of each image recorded on the CD is provided with the CD. CD ROMs have been published that include still images, motion image sequences and sound sequences. Recently, a digital camera, the Ricoh DC-1 has been introduced by the Ricoh Company, Japan. The digital camera has the capability of capturing and storing a plurality of still images and short motion sequences on a PCMCIA (Personal Computer Memory Card International Association) card. Problems associated with digital media carrying such data files of still images, motion sequences and sound sequences is in determining what is contained on the medium without having to access the data files on the medium and in locating specific files on the medium for access.

SUMMARY OF THE INVENTION

The present invention is directed to overcoming one or more of the problems set forth above. Briefly summarized, according to one aspect of the present invention, in combination with a digital recording medium having recorded thereon individually addressable digital data files containing still images, motion sequences and sound sequences, an index print is provided. The index print has a plurality of index images representing the still images, motion sequences and sound sequences on the digital recording medium, the index images including a subject matter descriptor, an index code usable for addressing the individual digital data files and a type indicator for indicating the type of subject matter in the data file. The index print according to the present invention is useful for accessing individual images, image sequences and sound sequences for viewing, listening to, cataloging and storing images. It is also useful for accessing the images and sound sequences for post processing, ordering prints of the still images or copies of the video and sound sequences, and other situations involving interaction with imaging service providers. The index print is also useful for visually comparing the subject matters of several recordings.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
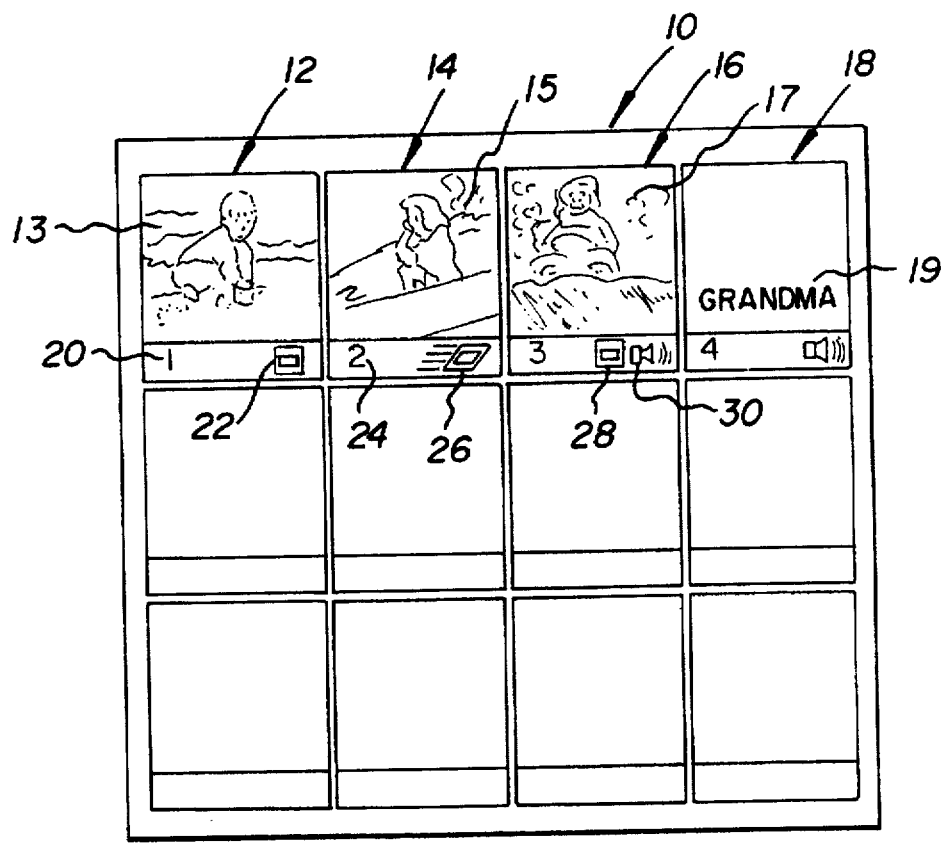
FIG. 1 shows one embodiment of an index print according to the present invention.

Referring to FIG. 1, an index print 10 according to the present invention includes a plurality of index images 12–18 representing the digital data files on a digital recording medium. Index image 12 includes a subject matter descriptor 13 that is a low resolution version (thumbnail) of a still image on the digital recording medium. The index image also includes an index code 20, located adjacent the thumbnail image, useful for accessing the data file containing the still image. The index image further includes a type indicator icon 22, located adjacent the thumbnail image 13, indicating that the data file contains a still image. Index image 14 includes a thumbnail image 15 of one frame of a motion sequence on the digital recording medium. An index code 24 and a type indicator icon 26 indicating the data file contains a motion sequence are provided adjacent the thumbnail image 15. Index image 16 includes a thumbnail image 17 of a still image contained in a data file which also contains a sound sequence. Type indicator icon 28 indicates that the file contains a still image, and type indicator icon 30 indicates that the file also contains a sound sequence. Index image 18 includes a subject matter descriptor 19 that is a text message describing the data file, in this case a sound recording of a person's (i.e. Grandma's) voice.

Index print 10 is constructed using a personal computer and appropriate software, for example, as follows. Video sequences are played on an Audio Visual (AV) personal computer using software such as QuickTime™ by Apple Computer Inc, Fusion Recorder by VideoFusion Inc. or Video Spigot SuperMac Inc. depending on how the video was formatted. The operator picks out the desired frames from the motion picture sequences for the index print and saves the frames in a format such as a PICT file. The index codes for addressing the digital data files containing the images are assigned, and appended to the PICT files. The index codes may be, for example, sequence numbers, data file location identifiers, tape counter counts, track numbers, etc. The icon indicating the type of data contained in the file is selected by the operator or automatically selected from a data file type indicator in the digital data and added to the index image. For sound sequences, appropriate text is generated by the operator and supplied in place of the thumbnail image. Other textual information relating to the file such as the subject of the image or sound sequence, the date and time of recording of the data, the author of the data, a location or event related to the data, or file size or duration of the sequence, may be added to the subject matter descriptor. Sound files may be monitored by an application such as Macromedia Sound Edit 16, or System 7 sound control panel and annotated text employed to label the sound file. The operator would format the index print in an application program such as Macromedia Freehand™ or 10 Macromedia Director™ (both by Macromedia Inc.), and Adobe Photoshop™ by Adobe Systems Inc. PICT image files (both those originating from stills and those grabbed from the motion sequences) are compiled, deduced to the "thumbnail image" size and arranged on a page. In cases of sound only, text replaces the thumbnail image. When the index print is compiled to the satisfaction of the operator, the operator prints the index image.

Figure 2:
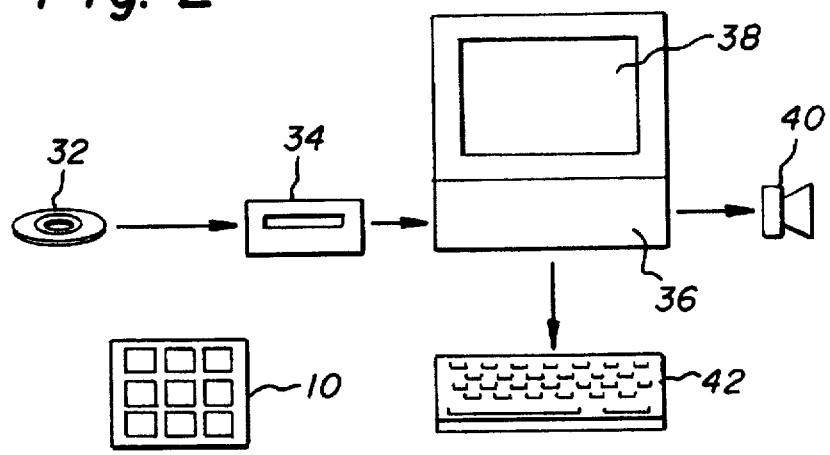
FIG. 2 is a schematic diagram showing a system employing a digital recording medium and index print according to the present invention.

Referring to FIG. 2, a system for using an index print according to the present invention is shown. An index print 10 includes a plurality of index images 12 that describe the contents of a CD ROM 32. The CD ROM is placed in a CD ROM drive 34 connected to a personal computer (PC) 36. The images in the digital data files on the CD ROM 32 can be displayed on a CRT display 38 connected to the PC 36 and sound sequences can be reproduced on a speaker 40. An operator, using the information provided on the index print 10, selects a desired file for display from the CD ROM 32 via an input device such as a keyboard 42.

Figure 3:
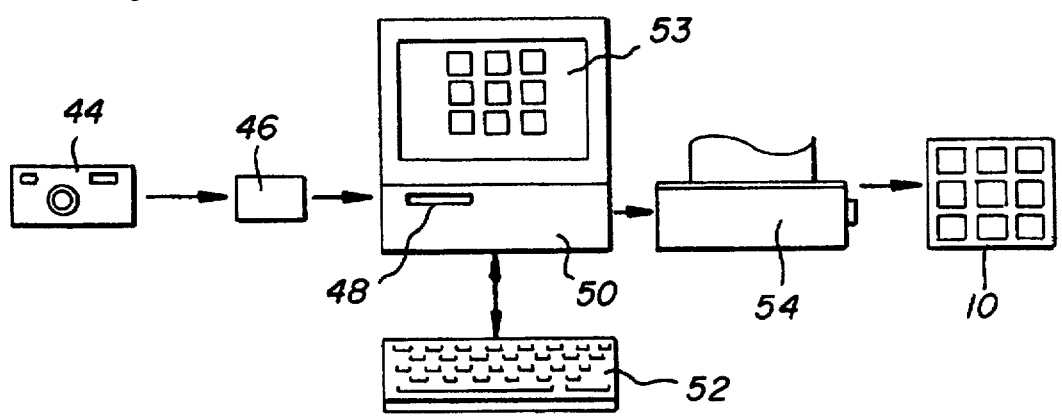
FIG. 3 is a schematic diagram showing a system for creating an index print according to the present invention.

Referring to FIG. 3, a system for creating an index print 10 according to the present invention is shown. A digital camera 44 such as the Ricoh DC-1 that is capable of capturing still and motion image sequences and accompanying sound and recording digitally on a PCMCIA card 46 is employed to create a sequence of digital files. The PCMCIA card 46 is removed from the camera and inserted into a PCMCIA slot 48 in an appropriately programmed personal computer 50. The computer reads the digital data files on the card and displays the contents to an operator. The operator, via an input device such as a keyboard 52, selects images from the data files for making thumbnail images and generates text for subject matter descriptors. The operator appends an index code and a type indicator to each subject matter descriptor to generate the index images, and arranges the index images for display on a CRT 53. When the index print 10 has been composed, the operator prints it on a printer 54, such as a thermal printer, connected to the PC 50. A suitable program for controlling the computer 50 to perform the steps outlined above can be readily generated by any programmer of ordinary skill in the art.

Figure 4:
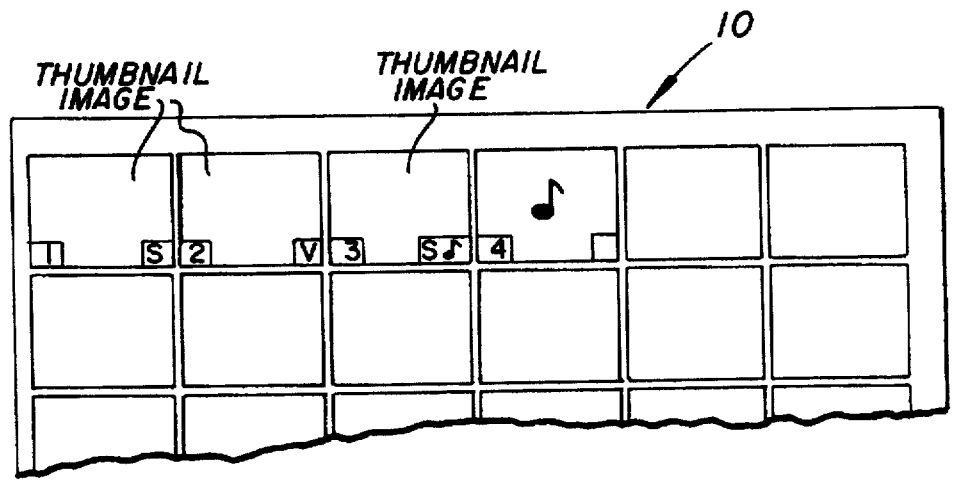
FIG. 4 is a schematic illustration showing an alternative embodiment of an index print according to the present invention.
Figure 5:
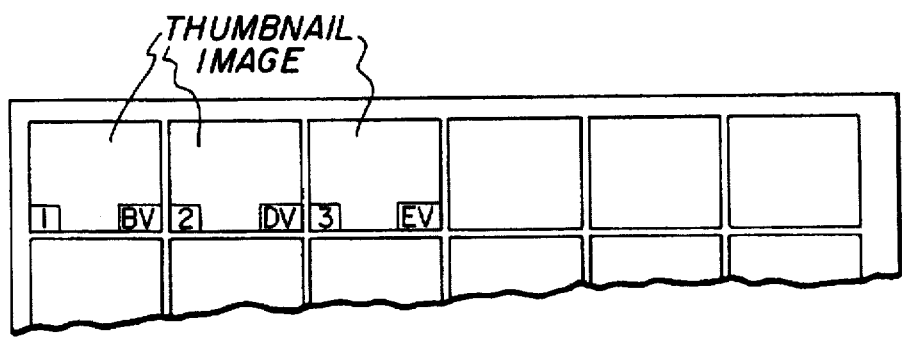
FIG. 5 is a schematic showing one approach to indicating a video sequence on an index print according to the present invention.

FIG. 4 is a partial schematic view of an index print 10 according to the present invention, using alphanumeric type indicators: "S" for still images and "V" for motion sequences, and a musical note as a type indicator icon for sound sequences. FIG. 5 is a partial schematic view of an index print 10 according to the present invention, wherein more than one thumbnail image is employed to indicate a motion sequence, and the type indicators indicate the location of the image represented by the thumbnail in the sequence. The beginning denoted by "BV", an image during the sequence denoted by "DV" and the end of the sequence denoted by "EV".

The invention has been described with reference to a preferred embodiment. However, it will be appreciated that variations and modifications can be effected by a person of ordinary skill in the art without departing from the scope of the invention.

PARTS LIST 10 index print
12 index image
13 thumbnail image
14 index image
15 thumbnail image
16 index image
17 thumbnail image
18 index image
19 subject matter descriptor
20 index code
22 type indicator icon
24 index code
26 type indicator icon
28 type indicator icon
30 type indicator icon
32 CD ROM disc
34 2CD ROM drive
36 personal computer
38 CRT display
40 speaker
42 keyboard
44 digital camera
46 PCMCIA card
48 PCMCIA slot
50 personal computer
52 keyboard
54 printer

We claim:

1. In combination with a digital recording medium having recorded thereon individually addressable digital data files containing still images, motion sequences and/or sound sequences, an index print, comprising: a visual image bearing medium having a plurality of index images representing the subject matter of the data file on the digital recording medium, the index images including a subject matter descriptor, an index code usable for addressing the individual digital data files and a type indicator for indicating the type of subject matter contained in the digital data file.

2. The index print claimed in claim 1, wherein the subject matter descriptor is a title identifying the subject matter of the data file.

3. The index print claimed in claim 2, wherein the title includes a time or date.

4. The index print claimed in claim 1, wherein the subject matter descriptor is a thumbnail image representing an image from the data file.

5. The index print claimed in claim 1, wherein the subject matter descriptor is a title and a thumbnail image representing an image from the data file.

6. The index print claimed in claim 1, wherein the type indicator is an icon.

7. The index print claimed in claim 1, wherein the type indicator is an alphanumeric character.

8. The index print claimed in claim 1, wherein a plurality of index images are employed to indicate a motion sequence and the type indicator includes an indication of the relative location of the index image in the motion sequence.

9. An information system, comprising:

a. a digital recording medium having recorded thereon individually addressable digital data files containing still images, motion sequences and sound sequences; and b. an index print having a plurality of index images representing the still images, motion sequences and sound sequences on the digital recording medium, the index images including a subject matter descriptor, an index code usable for addressing the individual digital data files, and a type indicator for indicating the type of subject matter contained in the digital data file.

* * * * *